US012742698B2

(12) United States Patent
Okuhira

(10) Patent No.: US 12,742,698 B2
(45) Date of Patent: Sep. 22, 2026

(54) EQUIPMENT INSPECTION SYSTEM

(71) Applicant: SMC CORPORATION, Tokyo (JP)

(72) Inventor: Hiroyuki Okuhira, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 365 days.

(21) Appl. No.: 18/689,475

(22) PCT Filed: Jul. 11, 2022

(86) PCT No.: PCT/JP2022/027222
§ 371 (c)(1),
(2) Date: Mar. 6, 2024

(87) PCT Pub. No.: WO2023/037754
PCT Pub. Date: Mar. 16, 2023

(65) Prior Publication Data

US 2024/0377278 A1 Nov. 14, 2024

(30) Foreign Application Priority Data

Sep. 9, 2021 (JP) ................................ 2021-146896

(51) Int. Cl.
*G01M 3/22* (2006.01)
*G01M 3/28* (2006.01)

(52) U.S. Cl.
CPC .......... *G01M 3/223* (2013.01); *G01M 3/2853* (2013.01)

(58) Field of Classification Search
CPC .................................. G01M 3/20; G01M 3/22
See application file for complete search history.

(56) References Cited

U.S. PATENT DOCUMENTS

| | | | |
|---|---|---|---|
| 5,574,213 | A | 11/1996 | Shanley |
| 6,439,031 | B1 | 8/2002 | Pieroni et al. |
| 2005/0072214 | A1 | 4/2005 | Cooper |

(Continued)

FOREIGN PATENT DOCUMENTS

| | | | |
|---|---|---|---|
| JP | 6-331483 | A | 12/1994 |
| JP | 2004-61409 | A | 2/2004 |

(Continued)

OTHER PUBLICATIONS

International Search Report issued Sep. 20, 2022 in PCT/JP2022/027222, filed on Jul. 11, 2022, 2 pages.

(Continued)

*Primary Examiner* — John E Breene
*Assistant Examiner* — Alex T Devito
(74) *Attorney, Agent, or Firm* — Oblon, McClelland, Maier & Neustadt, L.L.P.

(57) ABSTRACT

An equipment inspection system performs compressed air leakage inspection on a plurality of pieces of pneumatic equipment that are connected to pipes, or pipe joints that connect the respective pipes and the plurality of pieces of pneumatic equipment, has a first branched pipe and a second branched pipe. A flow rate measurement device is provided in the second branched pipe. The flow rate measurement device measures the flow rate of the compressed air flowing in the second branched pipe. A fluorescent solvent providing part is provided in the first branched pipe. A fluorescent solvent is supplied to the pipe from the fluorescent solvent providing part.

8 Claims, 5 Drawing Sheets

(56) References Cited

U.S. PATENT DOCUMENTS

| | | | | |
|---|---|---|---|---|
| 2011/0115223 | A1* | 5/2011 | Stahlkopf ................. | H02P 9/04 290/7 |
| 2018/0143097 | A1 | 5/2018 | Hun et al. | |
| 2022/0034453 | A1 | 2/2022 | Champagnac et al. | |

FOREIGN PATENT DOCUMENTS

| | | | |
|---|---|---|---|
| JP | 4297862 | B2 | 7/2009 |
| WO | WO 2020/128370 | A1 | 6/2020 |

OTHER PUBLICATIONS

International Preliminary Examining Authority issued Jun. 22, 2023 in PCT/JP2022/027222, filed on Jul. 11, 2022, 22 pages (with English Translation).

Indian Office Action issued Mar. 27, 2026 in Indian Patent Application No. 202447027790, 7 pages.

* cited by examiner

PC
VALVE CONTROLLER

20(22 or 24)
104(106 or 108)
114
122
112
118
126
130
142
Y
144
18
120
110
116
124
128
TO 150
140

158
F
104
20
130
LEAKAGE
LOCATION
FOURTH
SOLENOID
VALVE
LEAKAGE
LOCATION
F
128
106
22
130
FIFTH
SOLENOID
VALVE
NO LEAKAGE
128
108
24
130
SIXTH
SOLENOID
VALVE
NO LEAKAGE
128

EQUIPMENT INSPECTION SYSTEM

TECHNICAL FIELD

The present invention relates to an equipment inspection system for inspecting pneumatic equipment operated by compressed air.

BACKGROUND ART

Pneumatic equipment such as pneumatic cylinders operate by compressed air being supplied or discharged. Therefore, when compressed air is leaking from pneumatic equipment, the pneumatic equipment does not operate normally. To avoid this, the pneumatic equipment is inspected for the presence of compressed air leakage points. For example, soapy water is sprayed onto the pneumatic equipment. Soapy water bubbles when compressed air is leaking. The compressed air leakage location is identified by visual inspection of bubbles by the inspector. However, this inspection involves the concern of soapy water entering the inside of pneumatic equipment through leakage points.

Therefore, as described in JP 4297862 B2, colored inspection gases may be used. In the inspection method described in JP 4297862 B2, it is inspected whether leakage of an inspection gas occurs from a fuel cell. In this case, a mixture of fluorescent dye and oil (such as olive oil) is used as colorant. The mixture is turned to mist and supplied to a fuel cell accompanied by compressed air or hydrogen gas. The fuel cell is irradiated with light. In this state, the fuel cell is monitored with a camera.

When there is an inspection gas leakage location in the fuel cell, mist erupts from the leakage location. At this time, fluorescent dyes in the mist are enhanced by light. Therefore, it is easy to capture the fluorescence with the camera. Thus, it is determined that leakage of the inspection gas from the fuel cell is occurring. This inspection is an inspection with visualization since it is possible to visually confirm that the inspection gas is leaking.

SUMMARY OF THE INVENTION

In factories, the number of pieces of pneumatic equipment is in the order of tens plus a few to tens. When the configuration described in JP 4297862 B2 is applied to the leak inspection of pneumatic equipment, a light source and a camera must be arranged over the entire pneumatic equipment. This requires a large number of light sources and cameras. This results in high capital investment.

The present invention has the object of solving the aforementioned problems.

According to one embodiment of the present invention, there is provided an equipment inspection system for inspecting whether there is a compressed air leakage location in a plurality of pieces of pneumatic equipment connected to a pipe through which compressed air flows, or whether there is a compressed air leakage location in a pipe joint connecting the pipe and each of the plurality of pieces of pneumatic equipment with each other, including:

- a first branch pipe that branches from the pipe at a location upstream of the pipe joint and merges with the pipe at a location upstream of the pipe joint;
- a fluorescent solvent supply portion that is provided for the first branch pipe and supplies a fluorescent solvent to the pipe;
- a fluorescent solvent collection portion that is provided downstream of the fluorescent solvent supply portion and collects the fluorescent solvent supplied from the fluorescent solvent supply portion;
- a second branch pipe that branches from the pipe at a location upstream of the pipe joint and merges with the pipe at a location upstream of the pipe joint; and
- a flow rate measurement device that is provided for the second branch pipe and measures the flow rate of compressed air flowing through the second branch pipe.

According to the present invention, compressed air is supplied from the second branch pipe to a plurality of pieces of pneumatic equipment, and the flow rate of the compressed air in the second branch pipe after a predetermined time has elapsed can be measured. When the flow rate is larger than 0 at this time, it is determined that a compressed air leakage location exists in at least one of the plurality of pieces of pneumatic equipment or pipe joints.

Then, a fluorescent solvent is supplied to a plurality of pieces of pneumatic equipment. The fluorescent solvent erupts from pneumatic equipment or pipe joints where the compressed air leaks. The inspector can recognize the presence of the compressed air leakage point by observing this eruption.

In a factory, it is common that a plurality of sub-pipes are branched from a main pipe connected to a compressed air supply source, and pneumatic equipment is connected to the end of each sub-pipe. According to the present invention, in this case, the sub-pipe to which the pneumatic equipment (or the pipe joint) having the compressed air leakage is connected can be identified. Thereafter, it is possible to identify the pneumatic equipment having the compressed air leakage from among the plurality of pieces of pneumatic equipment connected to the sub-pipe.

Therefore, after identifying the sub-pipe to which the pneumatic equipment (or the pipe joint) having the compressed air leakage is connected, it is sufficient to observe only the pneumatic equipment connected to the sub-pipe. That is, it is unnecessary to observe all pneumatic equipment. This allows miniaturization of the equipment for observing pneumatic equipment.

The above objects, features and advantages will be readily understood from the following description of the embodiments, which will be described with reference to the accompanying drawings.

DETAILED DESCRIPTION OF THE INVENTION

The term “leakage location” in the following description refers to a location where compressed air leaks. The term "upstream" refers to upstream in the flow direction of compressed air. The term "downstream" refers to downstream in the flow direction of compressed air flow.

Figure 1:
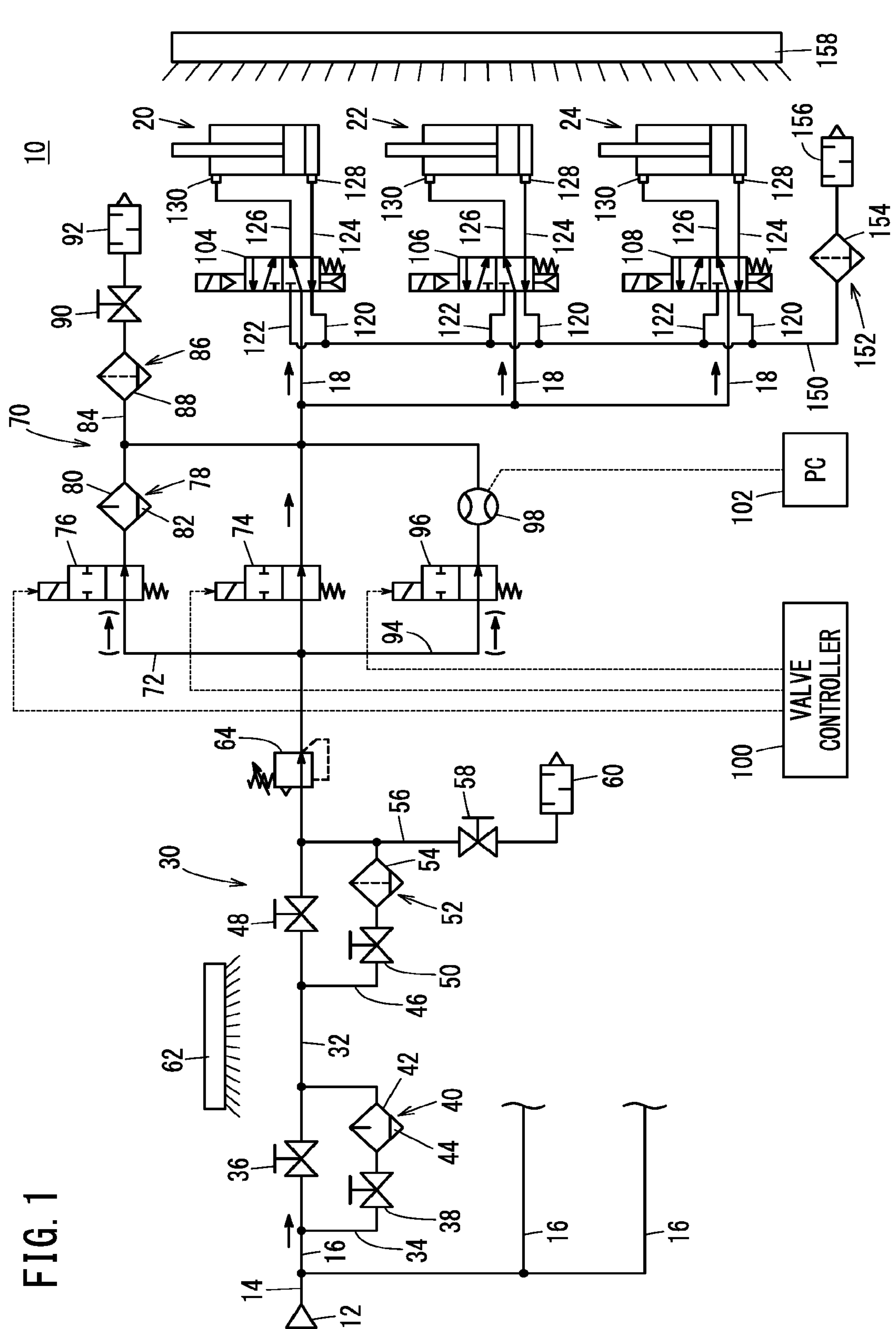
FIG. 1 is a schematic circuit diagram of a pneumatic equipment system.

FIG. 1 is a schematic circuit diagram of a pneumatic equipment system 10. The pneumatic equipment system 10 has a compressor 12 and a main pipe 14 connected to the compressor 12. The compressor 12 draws in and compresses the ambient air to produce compressed air.

A plurality of first sub-pipes 16 are connected to the main pipe 14. A plurality of (three in the present embodiment) second sub-pipes 18 are connected to one first sub-pipe 16. First, second, and third pneumatic cylinders 20, 22, and 24 are connected to the individual second sub-pipes 18. The first to third pneumatic cylinders 20, 22, and 24 are one type of pneumatic equipment. The compressed air obtained in the compressor 12 flows through the main pipe 14, the first sub-pipe 16, and the second sub-pipe 18. The compressed air is individually supplied to the first to third pneumatic cylinders 20, 22, 24. The first to third pneumatic cylinders 20, 22, 24 operate individually with the compressed air being a working air.

A pipe inspection system 30 is incorporated in the first sub-pipe 16. The pipe inspection system 30 is a system for inspecting whether or not there is a leakage location in an inspection target portion 32 of the first sub-pipe 16.

The pipe inspection system 30 has a first branch pipe 34. The upstream side of the first branch pipe 34 branches from the first sub-pipe 16 at a location upstream from the inspection target portion 32. The downstream side of the first branch pipe 34 merges with the first sub-pipe 16. A merging location of the first branch pipe 34 and the first sub-pipe 16 is located downstream of the branching location of the first branch pipe 34 and upstream of the inspection target portion 32. A first valve 36 is provided upstream of the inspection target portion 32 in the first sub-pipe 16. The first valve 36 is located between the branching location and the merging location of the first branch pipe 34 in the first sub-pipe 16.

The first branch pipe 34 is provided with a second valve 38. When the first valve 36 is in the open state and the second valve 38 is in the closed state, the compressed air flows through the first sub-pipe 16 and does not flow through the first branch pipe 34. Conversely, when the first valve 36 is in the closed state and the second valve 38 is in the open state, the compressed air flows through the first branch pipe 34 and does not flow through the first sub-pipe 16.

A first fluorescent solvent supply portion 40 is provided in the first branch pipe 34 downstream of the second valve 38. The first fluorescent solvent supply portion 40 has a first mist generator 42. A specific example of the first mist generator 42 is a lubricator. A lubricator is known as a container to contain lubricating oil. Alternatively, a known bubbler can be used as the first mist generator 42.

A first fluorescent solvent 44 is accommodated in the first mist generator 42. In this embodiment, the first fluorescent solvent 44 is obtained by diluting the fluorescent agent with a solvent. The solvent of the first fluorescent solvent 44 is, for example, water. In this case, the first fluorescent solvent 44 is an aqueous solution of fluorescent agent. Alternatively, oil-added water may be used as the solvent. In this case, the first fluorescent solvent 44 is an aqueous emulsion of fluorescent agent. Specific examples of the fluorescent agent include coumarin or vitamin B2.

As described above, the compressed air flows through the first branch pipe 34. When the compressed air is discharged toward the first fluorescent solvent 44 in the first mist generator 42, the first fluorescent solvent 44 is turned to mist. That is, mist of the first fluorescent solvent 44 is generated. The mist flows through the first branch pipe 34 accompanied by the compressed air and moves to the inspection target portion 32 of the first sub-pipe 16.

The pipe inspection system 30 has a second branch pipe 46. The upstream side of the second branch pipe 46 branches from the first sub-pipe 16 at a location downstream from the inspection target portion 32. In this embodiment, the downstream side of the second branch pipe 46 merges with the first sub-pipe 16. A merging location of the second branch pipe 46 and the first sub-pipe 16 is located downstream of the branching location of the second branch pipe 46 and downstream of the inspection target portion 32. A third valve 48 is provided downstream of the inspection target portion 32 in the first sub-pipe 16. The third valve 48 is located between the branching location and the merging location of the second branch pipe 46 with respect to the first sub-pipe 16.

The second branch pipe 46 is provided with a fourth valve 50. When the third valve 48 is in the open state and the fourth valve 50 is in the closed state, the compressed air flows through the first sub-pipe 16 and does not flow through the second branch pipe 46. Conversely, when the third valve 48 is in the closed state and the fourth valve 50 is in the open state, the compressed air flows through the second branch pipe 46 and does not flow through the first sub-pipe 16.

A first fluorescent solvent collection portion 52 is provided in the second branch pipe 46 downstream of the fourth valve 50. The first fluorescent solvent collection portion 52 has a first filter 54. The first filter 54 removes from the compressed air the first fluorescent solvent 44 (mist) contained in the compressed air. Accordingly, the compressed air without the mist flows downstream of the first filter 54.

In the second branch pipe 46, a first discharge pipe 56 (discharge portion) branches from the second branch pipe 46 at a location downstream from the first filter 54. A fifth valve 58 is provided at the end of the first discharge pipe 56. An outlet port of the fifth valve 58 is open to the atmosphere via a first silencer 60.

The first to fifth valves 36, 38, 48, 50, and 58 are, for example, automatic open-close valves. The first to fifth valves 36, 38, 48, 50, and 58 may be manual open-close valves.

The pipe inspection system 30 includes a first black light 62. The first black light 62 is supported, for example, on a pedestal (not shown). The pedestal is provided with a caster (not shown). Thus, the pedestal and the first black light 62 can move by the caster rolling. The first black light 62 moves close to or away from the inspection target portion 32.

Figure 4:
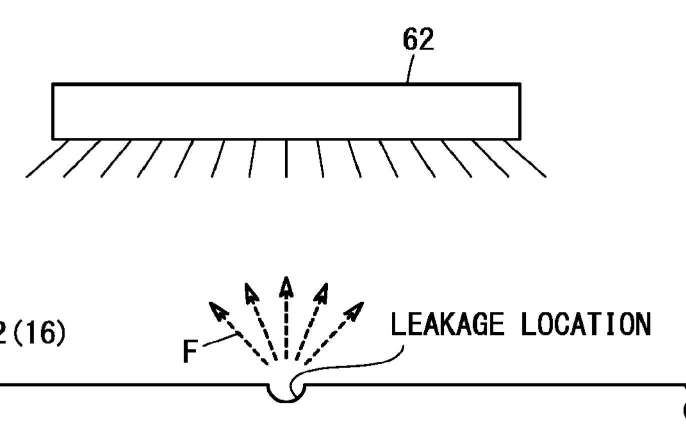
FIG. 4 is a schematic illustration showing a state in which fluorescence is generated from an inspection target portion of a pipe.

The first black light 62 irradiates the inspection target portion 32 with ultraviolet light. When a leakage location exists at the inspection target portion 32 and the compressed air is leaking from the leakage location, the compressed air and fluorescent solvent (mist) erupt from the leakage location. When ultraviolet light illuminates a fluorescent solvent, enhanced fluorescence F is observed, as schematically shown in FIG. 4.

The first sub-pipe 16 is provided with a regulator 64 downstream from the merging location of the second branch pipe 46. An equipment inspection system 70 is incorporated in the first sub-pipe 16 downstream from the regulator 64.

The equipment inspection system 70 is a system that identifies, out of the plurality of first sub-pipes 16, the first sub-pipe 16 to which the first to third pneumatic cylinders 20, 22, 24 or the pipe joints 128, 130 where the leakage of the compressed air occurs are connected. The equipment inspection system 70 is also a system that identifies which of the first to third pneumatic cylinders 20, 22, and 24 or the pipe joints 128 and 130 is leaking the compressed air.

The equipment inspection system 70 has a first branch pipe 72. The upstream side of the first branch pipe 72 branches from the first sub-pipe 16. The downstream side of the first branch pipe 72 merges with the first sub-pipe 16. The merging location of the first branch pipe 72 and the first sub-pipe 16 is located downstream of the branching location of the first branch pipe 72 and upstream of the second sub-pipe 18. The first sub-pipe 16 is provided with a first solenoid valve 74 downstream from the branching location of the first branch pipe 72.

The first branch pipe 72 is provided with a second solenoid valve 76. When the first solenoid valve 74 is in the open state and the second solenoid valve 76 is in the closed state, the compressed air flows through the first sub-pipe 16 and does not flow through the first branch pipe 72. Conversely, when the first solenoid valve 74 is in the closed state and the second solenoid valve 76 is in the open state, the compressed air flows through the first branch pipe 72 and does not flow through the first sub-pipe 16.

The first branch pipe 72 is provided with a second fluorescent solvent supply portion 78 downstream of the second solenoid valve 76. Similar to the first fluorescent solvent supply portion 40, the second fluorescent solvent supply portion 78 has a second mist generator 80. A specific example of the second mist generator 80 is a lubricator or bubbler, as in the case of the first mist generator 42.

A second fluorescent solvent 82 is accommodated in the second mist generator 80. In the present embodiment, the second fluorescent solvent 82 is obtained by diluting the fluorescent agent as described above with a solvent. The solvent of the second fluorescent solvent 82 is, for example, an organic solvent with high volatility. In particular, there are preferred organic solvents with low solubility with respect to the sealing material, grease, or the like in the first to third pneumatic cylinders 20, 22, and 24. Suitable examples of such organic solvents are alcohols. The organic solvent may be diluted alcohols. A specific example of alcohols is ethanol. In this case, the second fluorescent solvent 82 is an ethanol solution of fluorescent agent.

As described above, the compressed air flows through the first branch pipe 72. When the compressed air is discharged toward the second fluorescent solvent 82 in the second mist generator 80, the second fluorescent solvent 82 is turned to mist. That is, mist of the second fluorescent solvent 82 is generated. The mist of the second fluorescent solvent 82 flows through the first branch pipe 72 accompanied by the compressed air and moves to the first sub-pipe 16.

The first branch pipe 72 is provided with a second discharge pipe 84. The second discharge pipe 84 is provided with a second fluorescent solvent collection portion 86. The second fluorescent solvent collection portion 86 has a second filter 88. The second filter 88 removes the second fluorescent solvent 82 (mist) contained in the compressed air from the compressed air. Accordingly, the compressed air without the mist flows in the second discharge pipe 84 downstream of the second filter 88.

A sixth valve 90 is provided at the end of the second discharge pipe 84. The sixth valve 90 is an automatic open-close valve or a manual open-close valve. The outlet port of the sixth valve 90 is open to the atmosphere via a second silencer 92.

The equipment inspection system 70 has a second branch pipe 94. The upstream side of the second branch pipe 94 branches from the first sub-pipe 16. The downstream side of the second branch pipe 94 merges with the first sub-pipe 16. The merging location of the second branch pipe 94 and the first sub-pipe 16 is located downstream of the branching location of the second branch pipe 94 and upstream of the second sub-pipe 18.

The second branch pipe 94 is provided with a third solenoid valve 96 and a digital flow switch 98. The third solenoid valve 96 is located upstream of the digital flow switch 98. The digital flow switch 98 measures a flow rate of compressed air flowing through the second branch pipe 94. That is, the digital flow switch 98 is a flow rate measurement device. The digital flow switch 98 also serves as a flow rate control valve.

The first, second, and third solenoid valves 74, 76, and 96 are electrically connected to a valve controller 100. The valve controller 100 controls the first solenoid valve 74, the second solenoid valve 76, and the third solenoid valve 96 to open and close the first solenoid valve 74, the second solenoid valve 76, and the third solenoid valve 96. That is, the first solenoid valve 74, the second solenoid valve 76, and the third solenoid valve 96 are automatically opened and closed by the valve controller 100. The digital flow switch 98 is also electrically connected to a personal computer (PC) 102. A digital flow switch 98 measures what flow rate of compressed air is flowing through the second branch pipe 94. The PC 102 records the measured flow rate. That is, the PC 102 is a storage device.

FIG. 1 illustrates a case where three second sub-pipes 18 branch from one first sub-pipe 16. Each of three of the second sub-pipes 18 is provided with a fourth solenoid valve 104, a fifth solenoid valve 106, and a sixth solenoid valve 108. The number of the second sub-pipes 18 is not particularly limited to three. The number of the solenoid valves is typically the same as the number of the second sub-pipes 18.

Figure 2:
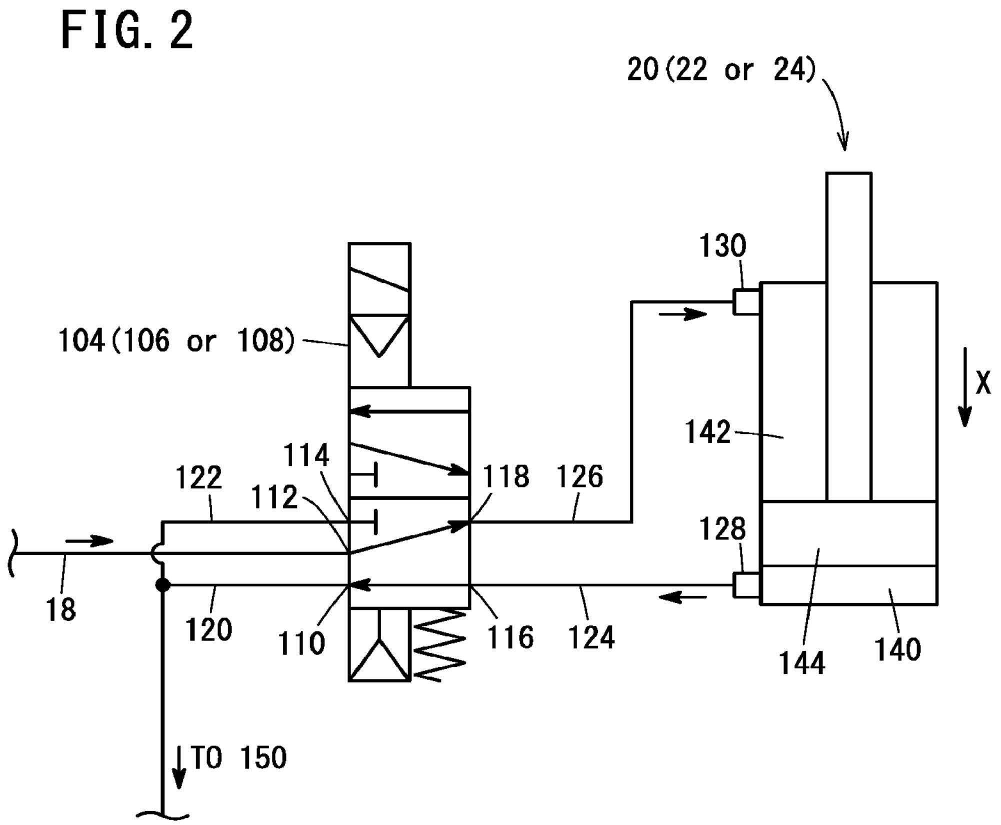
FIG. 2 is a schematic circuit diagram showing a state in which compressed air is supplied to a second inner chamber of a pneumatic cylinder and the compressed air is discharged from a first inner chamber of the pneumatic cylinder.

As shown in FIG. 2, the fourth solenoid valve 104 has a first port 110, a second port 112, a third port 114, a fourth port 116, and a fifth port 118. A first discharge pipe 120 is connected to the first port 110. The second sub-pipe 18 is connected to the second port 112. A second discharge pipe 122 is connected to the third port 114. A first connecting pipe 124 is connected to the fourth port 116. A second connecting pipe 126 is connected to the fifth port 118. The first connecting pipe 124 connects the fourth solenoid valve 104 and the first pneumatic cylinder 20 via a first pipe joint 128. Similarly, the second connecting pipe 126 connects the fourth solenoid valve 104 to the first pneumatic cylinder 20 via the second pipe joint 130.

A first inner chamber 140 and a second inner chamber 142 are formed inside the first pneumatic cylinder 20. The compressed air is supplied to or discharged from the first inner chamber 140 via the first connecting pipe 124. The compressed air is supplied to or discharged from the second inner chamber 142 via the second connecting pipe 126.

FIG. 2 shows a case where the compressed air is supplied to the second inner chamber 142 and is discharged from the first inner chamber 140. At this time, the compressed air that has flowed through the second sub-pipe 18 moves from the second port 112 to the fifth port 118 in the fourth solenoid valve 104. The compressed air then flows through the second connecting pipe 126 via the fifth port 118 and enters the second inner chamber 142. The compressed air in the second inner chamber 142 presses the piston 144 in the direction of the arrow X. As a result, the piston 144 moves in the direction of the arrow X in FIG. 2.

Meanwhile, the compressed air in the first inner chamber 140 is pushed out by the piston 144 into the first connecting pipe 124. The compressed air then travels from the fourth port 116 to the first port 110 in the fourth solenoid valve 104.

Furthermore, the compressed air is discharged to the first discharge pipe 120 via the first port 110. In the above process, the third port 114 is in the closed state.

Figure 3:
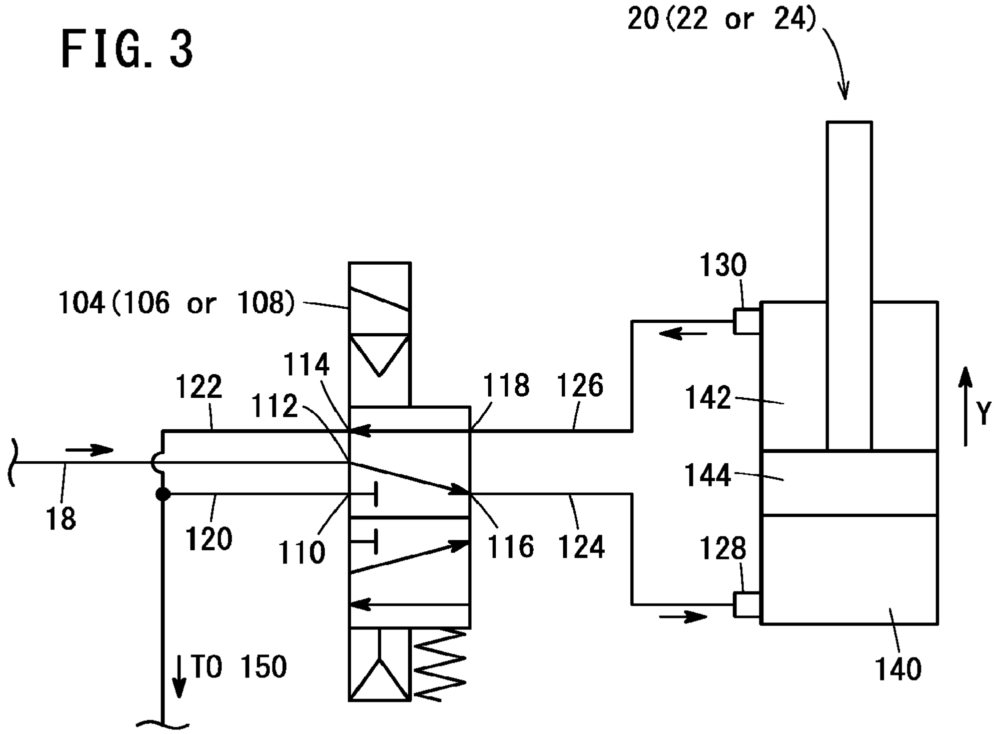
FIG. 3 is a schematic circuit diagram showing a state in which compressed air is supplied to the first inner chamber of the pneumatic cylinder and compressed air is discharged from the second inner chamber of the pneumatic cylinder.

As shown in FIG. 3, when the piston 144 is moved in the Y direction, which is the direction opposite to the X direction, the compressed air is supplied to the first inner chamber 140 and the compressed air is discharged from the second inner chamber 142. At this time, the compressed air that has flowed through the second sub-pipe 18 moves from the second port 112 to the fourth port 116 in the fourth solenoid valve 104. The compressed air then flows through the first connecting pipe 124 via the fourth port 116 and enters the first inner chamber 140. The compressed air in the first inner chamber 140 presses the piston 144 in the direction of the arrow Y. The piston 144 moves in the direction of the arrow Y in FIG. 3.

Meanwhile, the compressed air in the second inner chamber 142 is pushed out by the piston 144 into the second connecting pipe 126. The compressed air then travels from the fifth port 118 to the third port 114 in the fourth solenoid valve 104. Furthermore, the compressed air is discharged to the second discharge pipe 122 via the third port 114. In the above process, the first port 110 is in the closed state.

The above-described configuration and operation are also the same in the case of the fifth solenoid valve 106 and the second pneumatic cylinder 22 connected to the fifth solenoid valve 106. Therefore, the same components as those described above are denoted by the same reference numerals, and their detailed descriptions are omitted. Similarly, with regard to the sixth solenoid valve 108 and the third pneumatic cylinder 24 connected to the sixth solenoid valve 108, the same components as those described above are denoted by the same reference numerals, and detailed descriptions thereof are omitted.

All the first discharge pipes 120 and all the second discharge pipes 122 are connected to one third discharge pipe 150 (discharge portion). The third discharge pipe 150 is provided with a third fluorescent solvent collection portion 152. The third fluorescent solvent collection portion 152 has a third filter 154. The third filter 154 removes the second fluorescent solvent 82 (mist) contained in the compressed air from the compressed air as the first filter 54 and the second filter 88. Accordingly, the compressed air that does not contain mist flows downstream of the third filter 154. A portion of the third discharge pipe 150 downstream from the third filter 154 is opened to the atmosphere via a third silencer 156.

The equipment inspection system 70 includes a second black light 158. The second black light 158 is supported, for example, on a pedestal (not shown). The pedestal is provided with a caster (not shown). Thus, the pedestal and the second black light 158 can move by the caster rolling. The second black light 158 moves closer to or away from the first to third pneumatic cylinders 20, 22, 24.

Figure 5:
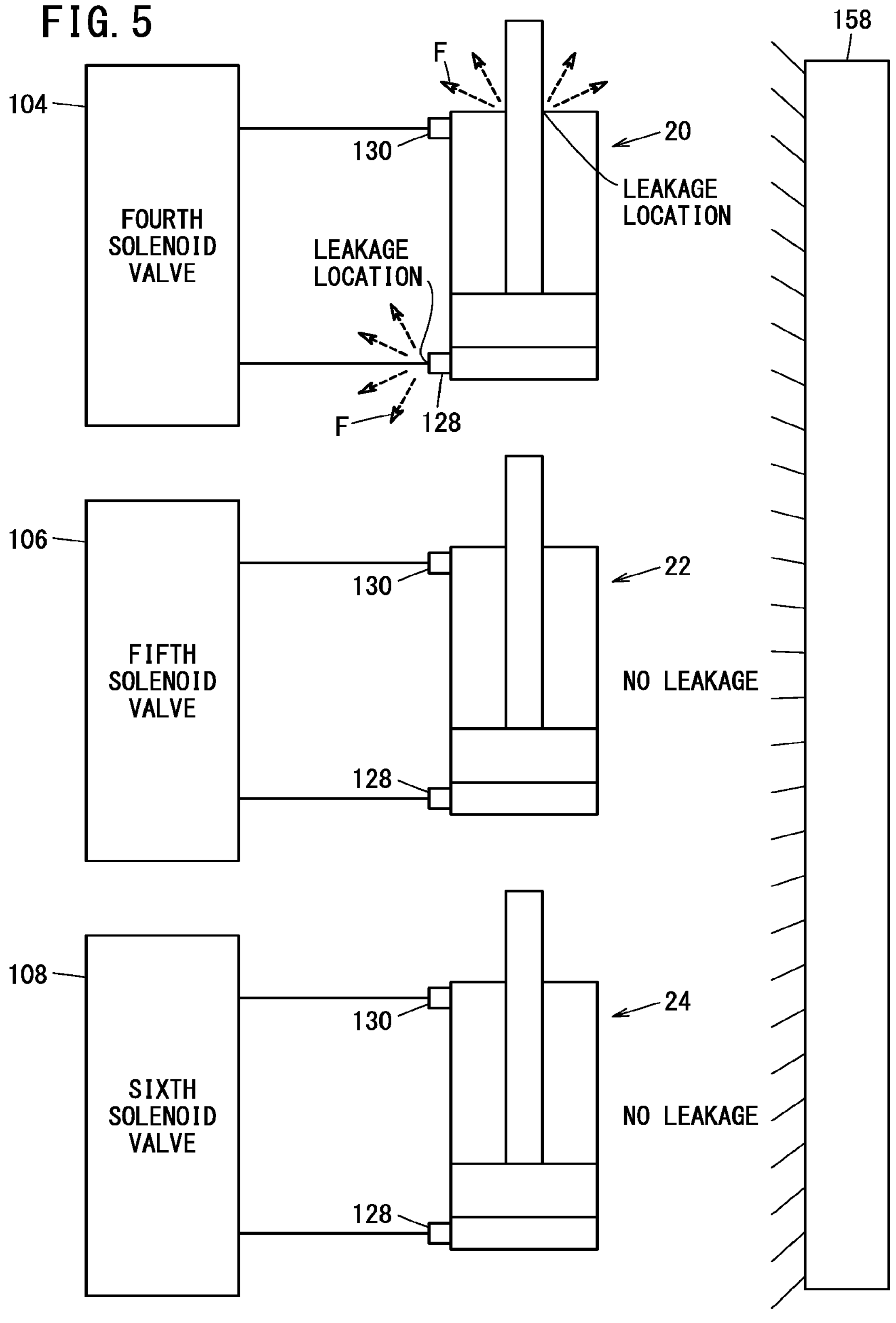
FIG. 5 is a schematic illustration showing a state in which fluorescence is generated from one pneumatic cylinder (or one pipe joint).

The second black light 158 irradiates the first to third pneumatic cylinders 20, 22, 24 and their surroundings with ultraviolet light. When a leakage location exists at any of the first to third pneumatic cylinders 20, 22, and 24, the first pipe joint 128, or the second pipe joint 130, compressed air and fluorescent solvent (mist) erupt from the leakage location as schematically shown in FIG. 5. When ultraviolet light illuminates the fluorescent solvent, enhanced fluorescence F is observed.

In FIG. 1, the first sub-pipe 16 and the second sub-pipe 18 are shown as straight seamless pipes for ease of understanding. However, the first sub-pipe 16 and the second sub-pipe 18 are not limited to the straight-shaped seamless pipes. Alternatively, the first sub-pipe 16 and the second sub-pipe 18 may be seamless pipes bent at a predetermined angle. The first sub-pipe 16 and the second sub-pipe 18 may be connected pipes in which a plurality of seamless pipes are connected via pipe joints.

In the present embodiment, the pneumatic equipment system 10 including the pipe inspection system 30 and the equipment inspection system 70 is basically configured as described above. Next, the operation and effect of the pipe inspection system 30 and the equipment inspection system 70 will be described in relation to a leakage inspection method. The leakage inspection method has steps detailed below. The leakage inspection method includes the leakage inspection method for pipes and equipment.

The leakage inspection of the pipe and the leakage inspection of the pneumatic equipment (the first to third pneumatic cylinders 20, 22, 24 in the present embodiment) are performed, for example, before the start of the operation of the pneumatic equipment system 10. This case will be described below by way of example.

First, it is inspected whether a leakage location exists at the inspection target portion 32 of the first sub-pipe 16 shown in FIG. 1. Specifically, ultraviolet light is emitted from the first black light 62 to the inspection target portion 32. In addition, the first valve 36 and the third valve 48 provided in the first sub-pipe 16 are closed. In this state, the compressed air is supplied from the compressor 12 to the main pipe 14. The compressed air is distributed to each of the plurality of first sub-pipes 16. Since the first valve 36 is closed, the compressed air is prevented from flowing downstream of the first valve 36 in the first sub-pipe 16.

Next, the second valve 38 and the fourth valve 50 are set to an open state. It should be noted that the second valve 38 and the fourth valve 50 may be set to an open state before the compressed air is supplied from the compressor 12 to the main pipe 14. If necessary, the fifth valve 58 is also opened.

The opening of the second valve 38 allows the compressed air to flow through the first branch pipe 34. The compressed air is discharged toward the first fluorescent solvent 44 in the first mist generator 42. As a result, mist of the first fluorescent solvent 44 is generated. The mist flows through the first branch pipe 34 accompanied by the compressed air and then flows into the inspection target portion 32 of the first sub-pipe 16.

Therefore, the compressed air with the mist flows through the inspection target portion 32. Since the third valve 48 is closed and the fourth valve 50 is open, the compressed air with mist flows through the inspection target portion 32 and then flows into the second branch pipe 46. Here, the solvent of the first fluorescent solvent 44 is water, an aqueous emulsion, or the like. The vapor pressure of water or aqueous emulsion is relatively low. Therefore, it is not particularly necessary to provide the first sub-pipe 16, the first branch pipe 34, the second branch pipe 46, the first mist generator 42, the first filter 54, and the like with pressure-resistant structures in consideration of the vapor pressure when the mist evaporates.

The second branch pipe 46 is provided with the first fluorescent solvent collection portion 52. The first fluorescent solvent collection portion 52 has the first filter 54. The mist (first fluorescent solvent 44) contained in the compressed air is collected by the first filter 54. This removes the mist from the compressed air. The mist-removed compressed air flows into the first discharge pipe 56. When the fifth valve 58 is in the open state, the compressed air is discharged from the fifth valve 58 to the atmosphere via the first silencer 60.

In contrast, when the fifth valve 58 is in the closed state, the mist-removed compressed air returns to the first sub-pipe 16 via the second branch pipe 46. The compressed air returns to the first sub-pipe 16 at a location of the first sub-pipe 16 downstream of the third valve 48. The compressed air is then supplied to the equipment inspection system 70. Since the mist has been removed from the compressed air, the concern that the water as the solvent flows into the first solenoid valve 74 to sixth solenoid valve 108 or the first to third pneumatic cylinders 20, 22, 24, etc. is eliminated. Therefore, the occurrence of corrosion in the first solenoid valve 74 to sixth solenoid valve 108 or the first to third pneumatic cylinders 20, 22, 24, etc. is avoided.

In the above compressed air flow process, when no leakage location exists at the inspection target portion 32, no fluorescence is observed from the inspection target portion 32. The leakage location can be, for example, a hole, a crack, or insufficient tightening of a pipe joint. In contrast, when the leakage location exists at the inspection target portion 32, the compressed air and the mist (first fluorescent solvent 44) erupt from the leakage location. The mist contains fluorescent agent. When the fluorescent agent is irradiated with ultraviolet light, enhanced fluorescence F is observed as shown in FIG. 4. An inspector can recognize that the compressed air is leaking based on the observation of the fluorescence F.

In the illustrated example of FIG. 4, the fluorescence F is diffused radially from a single point. The origin of the diffusion of the fluorescent F is the leakage location. In this way, by investigating the origin of the diffusion of the fluorescence F, the leakage location can be easily identified in a short time.

Moreover, even when the leakage amount of the compressed air is very small, the fluorescence F is observed. Therefore, for example, even when the leakage location is a fine hole, the inspector can detect the leakage location without overlooking it. Moreover, the inspector does not need to have any special knowledge in determining the presence of the leakage location. Similarly, when identifying the leakage location, the inspector does not need to have any special knowledge.

Furthermore, the inspector can judge whether a leakage location exists or not in a short time based on whether the fluorescence F has occurred or not. That is, the inspector can easily judge the presence of leakage regardless of the degree of proficiency, the degree of acquired knowledge, etc. It is also easy for the inspector to identify the leakage location.

Next, the first to third pneumatic cylinders 20, 22, 24 (and the pipe joints 128, 130) are inspected for leakage with the equipment inspection system 70. For this purpose, the fifth valve 58 is closed, and the compressed air that has flowed through the first branch pipe 34, the inspection target portion 32, and the second branch pipe 46 as described above is supplied to the first to third pneumatic cylinders 20, 22 and 24 via the regulator 64. In this case, the leakage inspection of the pipe (the inspection target portion 32) and the leakage inspection of the first to third pneumatic cylinders 20, 22, 24 (and the pipe joints 128, 130) can be performed simultaneously.

Alternatively, the first valve 36 and the third valve 48 are switched to the open state, and the second valve 38 and the fourth valve 50 are switched to the closed state. As a result, the compressed air does not flow through the first branch pipe 34 and the second branch pipe 46, but flows through only the first sub-pipe 16. The compressed air is supplied to the first to third pneumatic cylinders 20, 22, 24 through the regulator 64.

The valve controller 100 controls the first to third solenoid valves 74, 76, 96 to place the first solenoid valve 74 and the second solenoid valve 76 in the closed state and the third solenoid valve 96 in the open state. As a result, the compressed air that has passed through the regulator 64 flows into only the second branch pipe 94. In this way, when leakage inspection of equipment is performed, compressed air flows through the second branch pipe 94 instead of the first sub-pipe 16. The digital flow switch 98 measures the flow rate of the compressed air flowing through the second branch pipe 94 and converts the flow rate into an information signal. The PC 102 records the information signal as a flow rate. A display of the PC 102 displays a graph with elapsed time on the horizontal axis and flow rate on the vertical axis.

The compressed air that has flowed through the second branch pipe 94 flows into each of the plurality of second sub-pipes 18. The compressed air is introduced into the second inner chamber 142 of the first to third pneumatic cylinders 20, 22, 24 from the second connecting pipe 126 via the fourth solenoid valve 104, the fifth solenoid valve 106, and the sixth solenoid valve 108 (see FIG. 2). Thus, the piston 144 moves in the X direction. The compressed air in the first inner chamber 140 passes through the fourth solenoid valve 104, the fifth solenoid valve 106, and the sixth solenoid valve 108 via the first connecting pipe 124. The compressed air in the first inner chamber 140 passes through the first discharge pipe 120 and is then discharged to the atmosphere from the third discharge pipe 150 via the third silencer 156.

When no leakage location exists at the first to third pneumatic cylinders 20, 22, 24 (and the pipe joints 128, 130), the flow of compressed air from the second sub-pipe 18 to each second inner chamber 142 of the first to third pneumatic cylinders 20, 22, 24 is apparently stopped when the piston 144 reaches the forward end after a predetermined time. At the same time, the release of compressed air from each first inner chamber 140 of the first to third pneumatic cylinders 20, 22, 24 to the atmosphere is also apparently stopped. At this time, the flow rate of the compressed air in the second branch pipe 94 is 0.

In contrast, for example, when the leakage location exists at the first pneumatic cylinder 20, the compressed air flows from the second branch pipe 94 toward the first pneumatic cylinder 20 even after the piston 144 reaches the forward end. The compressed air supplied to the first pneumatic cylinder 20 erupts to the atmosphere from the leakage location. Therefore, after a predetermined time has elapsed since the compressed air started to be supplied from the second branch pipe 94 to the first to third pneumatic cylinders 20, 22, 24, the flow rate of the compressed air in the second branch pipe 94 is a value larger than 0. The inspector can recognize that the flow rate of the compressed air in the second branch pipe 94 is greater than 0 by checking what is shown on a display device of the digital flow switch 98 or a display of the PC 102.

In other words, the inspector can determine that a leak location exists in any of the first to third pneumatic cylinders 20, 22, 24 (or the pipe joints 128, 130) based on the fact that the flow rate of the compressed air in the second branch pipe 94 is greater than 0. Next, the inspector performs an operation to identify which of the first to third pneumatic cylinders 20, 22, 24 (or the pipe joints 128, 130) is leaking.

Specifically, the inspector operates the valve controller 100 to switch the second solenoid valve 76 to the open state while maintaining the closed state of the first solenoid valve 74. Also, the inspector operates the valve controller 100 to switch the third solenoid valve 96 to the closed state. By the above operation, the compressed air flows only in the first branch pipe 72. Furthermore, ultraviolet light is emitted from the second black light 158 to the periphery of the first to third pneumatic cylinders 20, 22, 24.

The compressed air flowing through the first branch pipe 72 is discharged toward the second fluorescent solvent 82 in the second mist generator 80. As a result, mist of the second fluorescent solvent 82 is generated. The mist is distributed to each of the plurality of second sub-pipes 18 via the first sub-pipe 16 after flowing through the first branch pipe 72 accompanied by the compressed air.

The compressed air with the mist then passes through the fourth to sixth solenoid valves 104 to 108 and is supplied to the first to third pneumatic cylinders 20, 22, 24. Preferably, first, the compressed air is supplied to the first inner chamber 140 (or the second inner chamber 142) and is discharged from the second inner chamber 142 (or the first inner chamber 140). After a predetermined time has elapsed, the compressed air supply destination is switched. That is, the compressed air is supplied to the second inner chamber 142 (or the first inner chamber 140) and is discharged from the first inner chamber 140 (or the second inner chamber 142).

The first pneumatic cylinder 20 will be described by way of example. When compressed air is supplied to the second inner chamber 142, the compressed air in the first inner chamber 140 flows through the first connecting pipe 124, the fourth port 116 of the fourth solenoid valve 104, the first port 110 of the fourth solenoid valve 104, the first discharge pipe 120, and the third discharge pipe 150 in this order (see FIG. 2). Conversely, when compressed air is supplied to the first inner chamber 140, the compressed air in the second inner chamber 142 flows through the second connecting pipe 126, the fifth port 118 of the fourth solenoid valve 104, the third port 114 of the fourth solenoid valve 104, the second discharge pipe 122, and the third discharge pipe 150 in this order (see FIG. 3). In the second pneumatic cylinder 22, the compressed air passes through the fifth solenoid valve 106 instead of the fourth solenoid valve 104. In the third pneumatic cylinder 24, the compressed air passes through the sixth solenoid valve 108 instead of the fourth solenoid valve 104.

The third discharge pipe 150 is provided with a third fluorescent solvent collection portion 152. The third fluorescent solvent collection portion 152 has the third filter 154. The mist (second fluorescent solvent 82) contained in the compressed air is collected by the third filter 154. This removes the mist from the compressed air. The mist-removed compressed air is discharged to the atmosphere from the third discharge pipe 150 via the third silencer 156.

For example, when only the first pneumatic cylinder 20 leaks, fluorescent light F that diffuses from the leakage location of the first pneumatic cylinder 20 is observed in the above distribution process as shown in FIG. 5. In contrast, the fluorescence F is never observed in the second and third pneumatic cylinders 22 and 24. Therefore, the inspector can determine that the compressed air leakage location is the first pneumatic cylinder 20 based on the fact that the fluorescence F is observed at the first pneumatic cylinder 20 and the fluorescence F is not observed at the second pneumatic cylinder 22 or the third pneumatic cylinder 24.

A case will be described where there is leakage at the second pipe joint 130 connecting the first pneumatic cylinder 20 and the second connecting pipe 126 with each other. In this case, for example, during the supply of compressed air to the first inner chamber 140 and the discharge of compressed air from the second inner chamber 142, the fluorescence F that diffuses from the second pipe joint 130 of the first pneumatic cylinder 20 is observed. In contrast, the fluorescence F is not observed at each second pipe joint 130 of the second pneumatic cylinder 22 and the third pneumatic cylinder 24. Based on this observation result, the inspector can determine that the compressed air leakage location is the second pipe joint 130 of the first pneumatic cylinder 20.

As described above, according to the equipment inspection system 70, first, the first sub-pipe 16 to which the first to third pneumatic cylinders 20, 22, 24 (or the pipe joints 128, 130), at which the leakage of the compressed air containing the mist occurs is connected is identified among the plurality of first sub-pipes 16. In this case, only the first to third pneumatic cylinders 20, 22, 24 and their surroundings where it has been determined that leakage is occurring are irradiated with the ultraviolet light. Next, based on the fact that the fluorescence F is enhanced by ultraviolet light, the pneumatic cylinder (or the pipe joint 128, 130) in which the leakage occurs is identified among the first to third pneumatic cylinders 20, 22, 24 (or the pipe joint 128, 130).

By the above-described procedure, it becomes unnecessary to irradiate the first to third pneumatic cylinders 20, 22, 24 (or the pipe joints 128, 130) of the other first sub-pipes 16 with ultraviolet light. Here, "the other first sub-pipes 16" are the first sub-pipes 16 whose flow rates measured by the digital flow switch 98 are 0. In other words, it is determined that the first to third pneumatic cylinders 20, 22, 24 (or the pipe joints 128, 130) have not leaked at the other first sub-pipes 16. That is, the first to third pneumatic cylinders 20, 22, 24 (or the pipe joints 128, 130) at which no leakage occurs do not need to be irradiated with ultraviolet light. Therefore, the second black light 158 can be made compact.

Even in leakage inspection of equipment, the inspector can easily judge whether compressed air is leaking from the first to third pneumatic cylinders 20, 22, 24 (or pipe joints 128, 130) regardless of the degree of proficiency, the degree of acquired knowledge, etc. In addition, the inspector can easily identify the leakage location in a short time.

Compressed air containing mist of the second fluorescent solvent 82 flows through the fourth to sixth solenoid valves 104 to 108 and the first to third pneumatic cylinders 20, 22, 24, etc. Here, the solvent of the second fluorescent solvent 82 is, for example, a highly volatile organic solvent. In this case, the mist evaporates quickly. Therefore, the mist hardly stays inside the second sub-pipe 18, the fourth solenoid valve 104 to the sixth solenoid valve 108, the first to the third pneumatic cylinders 20, 22, 24, etc. Therefore, the occurrence of failure or corrosion of the fourth solenoid valve 104 to the sixth solenoid valve 108 and the first to the third pneumatic cylinders 20, 22, 24, etc. due to the mist of the second fluorescent solvent 82 is avoided.

Moreover, since the mist evaporates quickly, the lubricant (grease, etc.) in the fourth to sixth solenoid valves 104 to 108 and the first to third pneumatic cylinders 20, 22, 24 hardly dissolves into the mist. Therefore, the sealing or operation performance of the fourth solenoid valve 104 to the sixth solenoid valve 108 and the first to the third pneumatic cylinders 20, 22, 24 is not affected.

The main material of the fourth solenoid valve 104 to the sixth solenoid valve 108 and the first to the third pneumatic cylinders 20, 22, 24, etc. is a metal material. Metal materials are chemically stable to organic solvents. Therefore, when the solvent of the second fluorescent solvent 82 is an organic solvent, the occurrence of failure or corrosion at the fourth solenoid valve 104 to the sixth solenoid valve 108 and the first to the third pneumatic cylinders 20, 22, 24, etc. is further avoided.

In particular, the metal material is chemically stable to alcohols such as ethanol. Moreover, alcohols are highly volatile. Therefore, the solvent of the second fluorescent solvent 82 is preferably alcohols such as ethanol.

The fourth solenoid valve 104 to the sixth solenoid valve 108 and the first to the third pneumatic cylinders 20, 22, 24, etc. have pressure-resistant structure. Therefore, even when the mist evaporates, there is no concern that the fourth solenoid valve 104 to the sixth solenoid valve 108 and the first to the third pneumatic cylinders 20, 22, 24, etc. will be deformed by the vapor pressure.

After the leakage inspection is completed as described above, the inspection target portion 32 or the equipment determined to have the leakage location is replaced. Then, the above leakage inspection is repeated until no leakage is found.

After all leakage inspections are completed, the sixth valve 90 is brought to an open state. Accordingly, the mist and the compressed air are discharged from the first branch pipe 72 to the atmosphere via the second silencer 92. Therefore, the mist is prevented from staying in the first branch pipe 72.

When the pneumatic equipment system 10 is operated, the first valve 36, the third valve 48, and the first solenoid valve 74 are in the open state, and the second valve 38, the fourth valve 50, the fifth valve 58, the second solenoid valve 76, and the third solenoid valve 96 are in the closed state. Thus, the compressed air starting from the compressor 12 is distributed to the respective first sub-pipes 16 via the main pipe 14. The compressed air is then distributed to the respective second sub-pipes 18 and becomes the working air for operating the first to third pneumatic cylinders 20, 22, 24. At this time, no compressed air flows through the first branch pipe 34 and the first branch pipe 72. Therefore, the mist does not flow together with the compressed air.

As described above, the inspector can judge whether or not a leakage location exists in a short time based on whether or not the fluorescence F has occurred. Therefore, for example, when compressed air leakage occurs due to unexpected incidents during the operation of the pneumatic equipment system 10, the operation of the pneumatic equipment system 10 is stopped and the leakage inspection of the pipes or equipment can be finished in a short time. In other words, it is not necessary to stop the pneumatic equipment system 10 for a long time. Therefore, it is possible to restore the pneumatic equipment system 10 at an early stage.

As described above, the present embodiment is an equipment inspection system (70) for inspecting whether there is a compressed air leakage location in a plurality of pieces of pneumatic equipment (20, 22, 24) connected to a pipe (18) through which compressed air flows, or whether there is a compressed air leakage location in a pipe joint (128, 130) connecting the pipe and each of the plurality of pieces of pneumatic equipment with each other, including

- a first branch pipe (72) that branches from the pipe at a location upstream of the pipe joint and merges with the pipe at a location upstream of the pipe joint;
- a fluorescent solvent supply portion (78) that is provided for the first branch pipe and supplies a fluorescent solvent (82) to the pipe;
- a fluorescent solvent collection portion (86, 152) that is provided downstream of the fluorescent solvent supply portion and collects the fluorescent solvent supplied from the fluorescent solvent supply portion;
- a second branch pipe (94) that branches from the pipe at a location upstream of the pipe joint and merges with the pipe at a location upstream of the pipe joint; and
- a flow rate measurement device (98) that is provided for the second branch pipe and measures the flow rate of compressed air flowing through the second branch pipe.

According to the above configuration, when there are a plurality of pipes, and a plurality of pieces of pneumatic equipment are connected to individual pipes, it is possible to identify the pipe to which the leaking pneumatic equipment or pipe joint is connected from the flow rate indicated by the flow rate measurement device. Subsequently, it is possible to identify the leaking pneumatic equipment or pipe joint from the plurality of pieces of pneumatic equipment connected to the identified pipe.

The inspector can easily and quickly identify the leaking pneumatic equipment or pipe joint based on whether fluorescence is observed from any of the plurality of pieces of pneumatic equipment or pipe joints. Moreover, when the inspector makes this identification, no special skill or knowledge is required.

In factories, the number of pieces of pneumatic equipment is in the order of tens to tens plus a few to tens. When the configuration described in JP 4297862 B2 is applied to the leak inspection of pneumatic equipment, a light source and a camera must be arranged over the entire pneumatic equipment. This requires ten plus a few more to tens of light sources and cameras. This results in high capital investment.

In contrast, according to the present embodiment, it is sufficient to observe only the pneumatic equipment connected to the identified pipe in a way described above. Therefore, the number of pieces of equipment (e.g., black lights and the like, which will be described later) required for observation is reduced. This allows for reduction in the capital investment. It also allows to simplify the equipment inspection system.

The present embodiment discloses an equipment inspection system wherein the fluorescent solvent supply portion includes a mist generator (80) that turns the fluorescent solvent to mist, and supplies the mist of the fluorescent solvent to the pipe.

Mist diffuses more easily than droplets. Therefore, by making the mist be contained in the compressed air, it is easy to make the mist (fluorescent solvent) reach the inspection target portion. It is also easy to move the mist (fluorescent solvent) from the inspection target portion.

The present embodiment discloses an equipment inspection system wherein the solvent of the fluorescent solvent is an organic solvent.

The main materials of pipes, pneumatic equipment, etc. are metal materials. Metal materials are chemically stable to organic solvents. Thus, the concern of failure or corrosion of the pipes and pneumatic equipment is eliminated.

The present embodiment discloses an equipment inspection system wherein the solvent of the fluorescent solvent belongs to alcohols.

Metal materials, which are the main materials of pipes, pneumatic equipment, etc., are chemically stable against alcohols. Also, alcohols are highly volatile. Thus, the fluorescent solvent rapidly evaporates. Therefore, a situation is avoided where fluorescent solvents (mist) remain in the pipes or inside the pneumatic equipment. For the reasons described above, the concern of failure or corrosion of the pipes and pneumatic equipment is further eliminated.

In addition, in this case, a situation is avoided where the lubricant inside the pneumatic equipment and the like is dissolved into the fluorescent solvent. As described above, this is because the fluorescent solvent evaporates quickly.

Thus, a situation is avoided where the sealing or operational performance of the pneumatic equipment and the like is affected.

A preferred specific example of the alcohols is ethanol. That is, the present embodiment discloses an equipment inspection system wherein the solvent of the fluorescent solvent is ethanol. However, the solvent is not particularly limited to alcohols. Examples of other solvents include organic solvents with higher vapor pressure than water and lower solubility such as grease.

The present embodiment discloses an equipment inspection system including a discharge portion (150) that is provided downstream of the pneumatic equipment and is open to the atmosphere.

According to the above configuration, compressed air containing a fluorescent solvent can be released from the pneumatic equipment to the atmosphere. Thus, it is possible to avoid the mist from remaining in the pneumatic equipment.

This embodiment discloses an equipment inspection system including a black light (158) that irradiates the pneumatic equipment with ultraviolet light.

When there is a leak in pneumatic equipment or a pipe joint, compressed air containing mist erupts from leakage locations. When ultraviolet light is emitted, fluorescence is enhanced by the ultraviolet light. Therefore, the leakage location of the compressed air can be easily identified.

Moreover, the black light is sufficient in size to illuminate the plurality of pieces of pneumatic equipment connected to the pipe identified in a way described above. This allows for reduction in the capital investment.

In should be noted that the present invention is not limited to the embodiments described above, and various additional or modified configurations could be adopted therein without departing from the essence and gist of the present invention.

For example, when only inspection of the leakage of compressed air from a pipe is performed, it is also possible to discharge the compressed air to the atmosphere from the fifth valve 58 via the first silencer 60. In contrast, when only inspection of the leakage of compressed air from the equipment is performed, the compressed air is supplied to the first branch pipe 72 with the first valve 36 and the third valve 48 being in the open state and the second valve 38, the fourth valve 50, and the fifth valve 58 being in the closed state.

As can be understood from this, it is also possible to perform leakage inspection of the pipe and leakage inspection of the equipment separately. Also, it is not particularly necessary to incorporate the pipe inspection system 30 into the pneumatic equipment system 10 together with the equipment inspection system 70. That is, only the equipment inspection system 70 may be incorporated into the pneumatic equipment system 10.

The pneumatic equipment is not particularly limited to pneumatic cylinders. Other specific examples of pneumatic equipment include pneumatic chucks or pneumatic actuators.

The invention claimed is:

1. An equipment inspection system for inspecting whether there is a compressed air leakage location in a plurality of pieces of pneumatic equipment connected to each of a plurality of second sub-pipes branching from each of a plurality of first sub-pipes branching from a pipe through which compressed air flows, or whether there is a compressed air leakage location in a pipe joint connecting each of the plurality of second sub-pipes and each of the plurality of pieces of pneumatic equipment with each other, comprising:

a first branch pipe that branches from each of the plurality of first sub-pipes at a location upstream of the pipe joint and merges with each of the plurality of first sub-pipes at a location upstream of the pipe joint;

a fluorescent solvent supply portion that is provided for the first branch pipe and supplies a fluorescent solvent to the plurality of second sub-pipes via each of the plurality of first sub-pipes;

a fluorescent solvent collection portion that is provided downstream of the fluorescent solvent supply portion and collects the fluorescent solvent supplied from the fluorescent solvent supply portion;

a second branch pipe that branches from each of the plurality of first sub-pipes at a location upstream of the pipe joint and merges with each of the plurality of first sub-pipes at a location upstream of the pipe joint; and a flow rate measurement device that is provided for the second branch pipe and measures a flow rate of compressed air flowing through the second branch pipe;

a first valve that is, at each of the plurality of first sub-pipes, arranged downstream of a location where each of the first branch pipe and the second branch pipe branches and arranged upstream of a location where each of the first branch pipe and the second branch pipe merges;

a second valve that is provided for the first branch pipe; and a third valve provided for the second branch pipe, wherein compressed air selectively flows through any of each of the plurality of first sub-pipes, the first branch pipe, or the second branch pipe by the first valve, the second valve, and the third valve being opened and closed, and compressed air having flowed through any of each of the plurality of first sub-pipes, the first branch pipe, or the second branch pipe is supplied to the plurality of pieces of pneumatic equipment via the plurality of second sub-pipes.

2. The equipment inspection system according to claim 1, wherein the fluorescent solvent supply portion includes a mist generator that turns the fluorescent solvent to mist, and supplies the mist of the fluorescent solvent to the plurality of second pipes.

3. The equipment inspection system according to claim 1, wherein a solvent component of the fluorescent solvent is an organic solvent.

4. The equipment inspection system according to claim 3, wherein the solvent component of the fluorescent solvent is an alcohol.

5. The equipment inspection system according to claim 4, wherein the solvent component of the fluorescent solvent is ethanol.

6. The equipment inspection system according to claim 1, further comprising a discharge portion that is provided downstream of the plurality of pieces of pneumatic equipment and is open to atmosphere.

7. The equipment inspection system according to claim 1, further comprising a black light that irradiates the plurality of pieces of pneumatic equipment with ultraviolet light.

8. The equipment inspection system according to claim 1, wherein the fluorescent solvent collection portion includes a first fluorescent solvent collection portion provided for a first discharge pipe connected to a downstream side of the first branch pipe, and a second fluorescent solvent collection portion provided for a second discharge pipe through which compressed air discharged from the pneumatic equipment flows.

* * * * *